United States Patent
Kraus

(10) Patent No.: US 6,845,985 B2
(45) Date of Patent: Jan. 25, 2005

(54) ROTATING MECHANICAL SEAL

(75) Inventor: Reinhold Kraus, Mörlenbach (DE)

(73) Assignee: Firma Carl Freudenberg, Weinheim (DE)

( * ) Notice: Subject to any disclaimer, the term of this patent is extended or adjusted under 35 U.S.C. 154(b) by 22 days.

(21) Appl. No.: 10/005,363

(22) Filed: Nov. 8, 2001

(65) Prior Publication Data

US 2002/0074728 A1 Jun. 20, 2002

(30) Foreign Application Priority Data

Nov. 13, 2000 (DE) .................................. P 100 56 102

(51) Int. Cl.$^7$ ................................................ F16J 15/34
(52) U.S. Cl. ........................................ 277/405; 277/938
(58) Field of Search .............................. 277/404, 405, 277/938

(56) References Cited

U.S. PATENT DOCUMENTS

| 4,416,458 A | * | 11/1983 | Takenaka et al. ............. 277/399 |
| 4,515,860 A | * | 5/1985 | Holzl ........................... 428/408 |
| 4,621,017 A | * | 11/1986 | Chandler et al. ............. 428/328 |
| 4,623,153 A |   | 11/1986 | Nagasawa |
| 5,052,363 A | * | 10/1991 | Stiles ........................... 123/568.29 |
| 5,326,732 A | * | 7/1994 | Ogawa ........................... 501/90 |
| 5,441,799 A | * | 8/1995 | Owens et al. ............. 428/312.6 |
| 5,529,315 A | * | 6/1996 | Borrino et al. ............. 277/352 |
| 5,635,300 A | * | 6/1997 | Kostikov et al. ............. 428/408 |
| 5,834,387 A | * | 11/1998 | Divakar et al. ............. 501/88 |
| 5,968,653 A | * | 10/1999 | Coppella et al. ............. 428/408 |
| 5,998,318 A | * | 12/1999 | Takanami et al. ............. 501/90 |
| 6,109,617 A | * | 8/2000 | Laney ........................... 277/369 |
| 6,358,565 B1 | * | 3/2002 | Krenkel et al. ............. 427/343 |
| 6,412,822 B1 | * | 7/2002 | Omiya et al. ............. 285/121.3 |
| 6,528,168 B1 | * | 3/2003 | Matsumoto et al. ......... 428/408 |

FOREIGN PATENT DOCUMENTS

| EP | 0571791 A1 | * | 12/1993 |
| EP | 1111278 A1 | * | 6/2001 |
| JP | 84001236 B | * | 1/1984 |
| JP | 07309662 A | * | 11/1995 |
| JP | 10-212182 | * | 8/1998 |
| JP | 10212182 A | * | 8/1998 |
| JP | 10-231938 | * | 9/1998 |
| JP | 10-279376 | * | 10/1998 |
| JP | 2000-88111 | * | 3/2000 |
| WO | WO00/15982 | * | 3/2000 |

* cited by examiner

Primary Examiner—Alison K. Pickard
(74) Attorney, Agent, or Firm—Kenyon & Kenyon

(57) ABSTRACT

A rotating mechanical seal with a sliding ring, characterized by the sliding ring (5) being attached by way of an O-ring (6) on a shaft (1) of a compressor and rotating with the shaft (1) and by a non-rotating backing ring (4) being provided which is attached by way of an O-ring (3) to a housing (2) of the compressor so as to be gas-tight wherein the sliding ring (5) and backing ring (4) are pressed one against another by a spring (8) to form a seal and slide one upon the other, wherein one of the rings (4,5) is made of a carbon and silicon carbide composite material and the other of a silicon carbide material.

8 Claims, 2 Drawing Sheets

ROTATING MECHANICAL SEAL

BACKGROUND OF THE INVENTION

1. Field of the Invention

The present invention pertains to a high-pressure fluid seal and in particular one incorporating a rotating mechanical seal which is used as the shaft sealing device in compressors for air conditioning systems and in particular for automotive air conditioning systems which use carbon dioxide as the refrigerant.

2. Description of Related Art

Automative air conditioning units have traditionally used fluorocarbons as the refrigerant. Adverse effects of the fluorocarbons (Flon R 134a) on global warming have, however, prompted studies with a number of other refrigerants in order to replace fluorocarbons. One of the most promising refrigerants for this purpose is carbon dioxide ($CO_2$).

While the use of fluorocarbons as a refrigerant requires, at normal conditions, intake pressure of about 0.2 MPa at the compressor and displacement pressure of about 2 MPa, an increase in the required compressor pressure occurs when using carbon dioxide as the refrigerant up to intake pressure of 3 MPa and displacement pressure of about 7 MPa.

Described in U.S. Pat. No. 4,623,153 is a compressor which utilizes a fluorocarbon as the refrigerant and employs an oil-type shaft seal comprising a combination of a rubber ring and a synthetic resin ring. The use of carbon dioxide as the refrigerant, however, entails working pressure at the compressor which is higher than that indicated above regardless of the use of the oil-type seal.

Among the potential replacement seals is the conventional rotating mechanical seal which, at higher pressure, may be employed in tandem and when installed in a series of two each will reduce the loading on each seal to about the half. This approach is, however, deficient to the extent that the space required for the seals is too large.

In general, the sliding ring is manufactured from a slip-promoting carbon material and the backing ring from a slip-promoting material of greater hardness than the carbon slip-promoting material such as, for example, silicon carbide or tungsten carbide.

In rotating mechanical seals, the carbon slip-promoting material, which exhibits a lower modulus of elasticity, is deformed under pressure when it is subjected to high pressure due to the carbon dioxide pressure whereby damage to the sealing surfaces will occur. To avoid this problem, it is conceivable to use a combination of a hard material with a high modulus of elasticity such as silicon carbide or tungsten carbide for both parts in order to avoid deformation and damage to the sealing surfaces.

The sliding properties between a combination of these hard materials is, however, disadvantageous to the extent that under poor lubricating conditions, erosion or roughening of the surface or similar effects occur wherein the sealing performance is reduced.

SUMMARY OF THE INVENTION

It is an object of the invention to solve the above-mentioned problems. It is a further object of the invention to provide a rotating mechanical seal as shaft seal for a compressor which operates at particularly high temperature and which prevents damage to the sealing surfaces while largely eliminating erosion or roughening of the surfaces or the like, whereby leakage of the refrigerant and the lubricant is prevented.

These and other objects of the invention are achieved by a rotating mechanical seal incorporating a sliding ring attached to a compressor shaft by way of an O-ring and rotating with the shaft and a stationary backing ring attached to the compressor housing by way of an O-ring so as to prevent gas leakage. Both are pressed against one another by a spring and are sealed and slide against one another wherein one of the rings comprises a carbon and silicon carbide composite material and the other a silicon carbide material.

BRIEF DESCRIPTION OF THE DRAWINGS

The present invention will be described in greater detail with reference to the following drawings wherein.

DETAILED DESCRIPTION OF THE INVENTION

The carbon and silicon carbide composite material exhibits a structure created through partial conversion of the surface layer of the carbon substrate into a silicon carbide material. The silicon carbide material is preferably formed by way of reactive or atmospheric sintering. The silicon carbide material preferably exhibits a silicon carbide content of at least 85% or higher. In this way, sufficient surface hardness and modulus of elasticity are guaranteed.

The carbon and silicon carbide composite material is obtained through partial conversion of the surface layer of the carbon substrate into a silicon carbide material and exhibits a higher modulus of elasticity than common carbon slip-promoting materials so that it is minimally susceptible to deformation, even at high pressure, and nonetheless incorporates a self-lubricating, carbon-containing component whereby problems such as erosion, surface roughness and the like are minimized even under poor lubrication conditions. A combination equipped with a silicon carbide slip-promoting material thus makes it possible to maintain a durable seal. In regard to its pressure resistance and its slip-promoting characteristics, the carbon and silicon carbide composite material should preferably exhibit carbon content of from 40% to 85% and silicon carbide content of from 60% to 15% in the surface layer.

In its function as the slip-promoting material, the silicon carbide material should preferably exhibit individual, non-contiguous pores. Used preferably as the silicon carbide material is a silicon carbide material which is obtained by way of atmospheric or reactive sintering. The use of silicon carbide material with individual pores permits maintenance of a film of fluid on the sealing surface even under poor lubrication conditions whereby stable sealing is achieved under the specified operating conditions. A less favorable sealing effect occurs, however, if the individual pores deviate from a specific mean pore diameter and porosity so that, in order to ensure tightness at the seal, the silicon carbide material preferably exhibits individual pores with a mean pore diameter of not greater than 60 $\mu$m at porosity of 2% to 15%.

The roughness of the sealing surface influences the tightness in the seal. The carbon and silicon carbide composite material preferably exhibits ultimate roughness of from 0.005 to 0.07 $\mu$m and the silicon carbide material preferably a surface roughness in the range of 0.002 to 0.03 $\mu$m, expressed as the mean arithmetic roughness ($R_a$) (with the exception of the individual pores) so that they prevent leakage.

Figure 1:
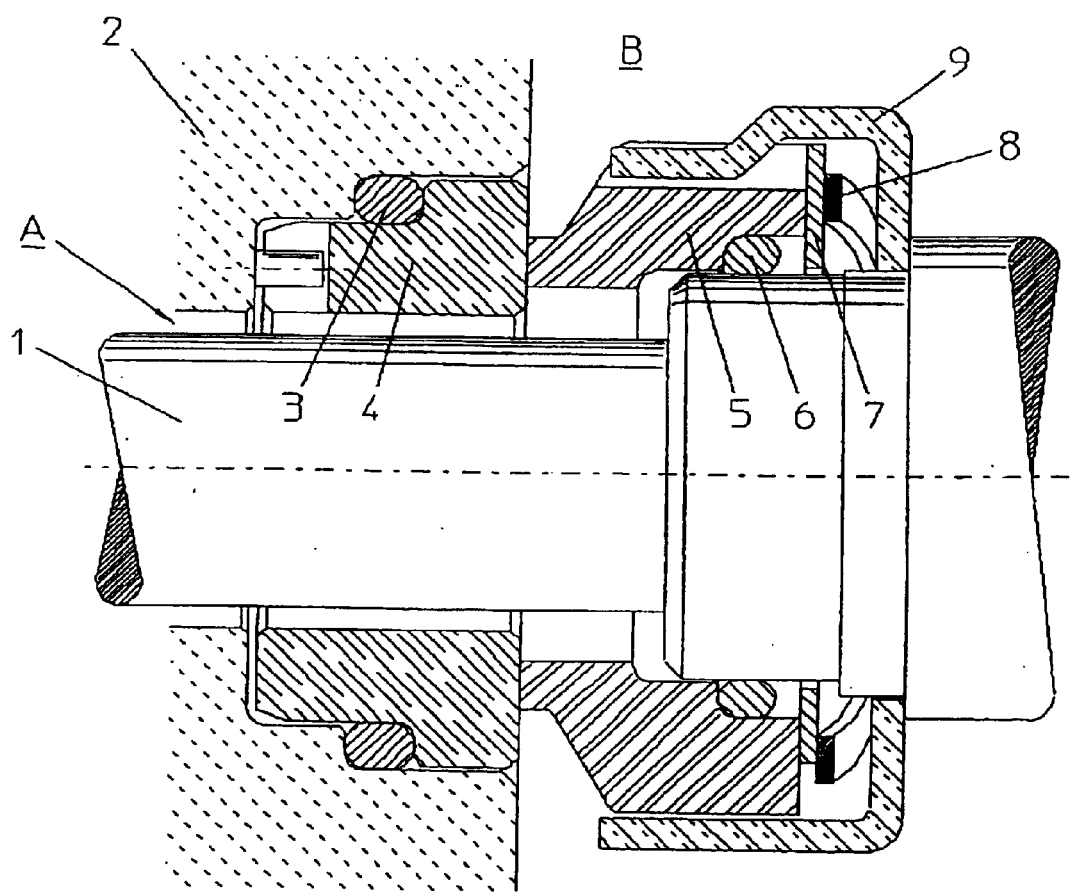
FIG. 1 shows the rotating mechanical seal in a cross-section.

FIG. 1 shows the basic structure for the rotating mechanical seal in the present invention. A sliding ring 5 is attached to the shaft 1 of a compressor by way of the O-ring 6. The sliding ring 5 is attached to the carrier housing 9 so as to not rotate. The housing 9 in turn is seated on the shaft 1 in such a way as to prevent relative rotation so that it rotates together with the shaft 1. The sliding ring 5 is pressed against the forward surface of the backing ring 4 by way of thrust ring 7 acted upon by spring 8. The sliding ring 5 is held in the carrier housing 9. Sliding ring 5 and backing ring 4 are pressed one against the other and form a sealing surface. The backing ring 4 is mounted gas-tight in a housing 2 by way of the O-ring 3 and is secured to prevent rotation by way of a pin or the like. The sealing surface formed by the sliding ring 5 and the backing ring 4 prevents any leakage of the carbon dioxide refrigerant and the lubricant oil which are present on the liquid side in chamber B of the seal to the atmospheric side A.

Either the sliding ring 5 or the backing ring 4 is made of a carbon and silicon carbide composite material and the other comprises a silicon carbide material. The carbon and silicon carbide composite material is created by treating a carbon substrate with silicon wherein partial conversion of the carbon into silicon carbide takes place. Here, there is no particular limitation on the process for the conversion of carbon into silicon carbide which includes, for example, a gas treatment process using a gas containing silicon in the form of silicon monoxide, for example, or also a liquid process in which silicon permeates the carbon material and reacts there. To permit permeation of the silicon, a carbon substrate may be used which exhibits fine, individual, non-contiguous pores. In this case, the silicon permeates and infiltrates the pores present at the surface of the carbon substrate and generates silicon carbide in this area.

The carbon and silicon carbide composite material is obtained by conversion of the surface layer at the carbon substrate. When the carbon substrate is converted to silicon carbide in this way, it assumes a structure in which the outermost layer consists of a silicon carbide layer with higher carbon content and in case of deeper penetration into the interior makes the transition from a layer comprising carbon and silicon carbide to a layer made up only of carbon. The sliding surface is created by removing the outermost layer so that layers containing carbon and silicon carbide are formed in the final, machined state. With reference to pressure-resistance and slip-promoting characteristics, the outermost layer of the slip-promoting surface is provided with carbon content of from 40% to 85% and silicon carbide content of from 60% to 15%. The depth of the layer containing silicon carbide is from about 1 to 55 mm. The ratio of silicon carbide to carbon at the surface layer can be derived from the ratio of the surfaces areas occupied by each component in the surface.

The carbon and silicon carbide composite material exhibits a high modulus of elasticity. In general, the carbon material used in rotating mechanical seals exhibits a modulus of elasticity of about 10 to 13 GPa. In contrast to this, the carbon and silicon carbide composite material, at silicon carbide conversion ratio of 44%, has a higher modulus of elasticity at about 25 GPa. The modulus of elasticity for the carbon and silicon carbide composite material is relatively low in comparison to the modulus of elasticity for silicon carbide itself at about 360 GPa. It does, however, effect a reduction in pressure-induced deformation at high pressures.

Since the carbon material is self-lubricating, it prevents erosion or surface roughening so that it, as the slip-promoting material, ensures a stable seal. If the conversion ratio in the silicon carbide conversion exceeds 60%, the hardness rises so that the sealing surface tends to erode or the surface roughens in a poorly lubricated environment. Silicon carbide conversion at a rate of less than 15% induces a drop in the modulus of elasticity, wherein the material is more easily deformed under pressure at the sealing surface which can lead to failure of the seal due to accelerated wearing at the sealing surface. Carbon content should lie at between 40% and 85% and the silicon carbide content should lie between 60% and 15%.

The silicon carbide material which forms the other ring is preferably obtained through a reactive sintering process in which a pre-formed object made of carbon and silicon carbide is subjected to penetration with silicon at high temperatures and an atmospheric sintering process which works with a silicon carbide powder or the like. The silicon carbide material preferably contains at least 85% silicon carbide. The required surface hardness and modulus of elasticity are ensured in this way.

The silicon carbide material is a material exhibiting individual, non-contiguous pores and which is used as the sealing surface material for the rotating mechanical seal. This silicon carbide material with individual pores makes it possible to maintain a film of liquid on the surface of the seal even in a poorly lubricated environment, wherein reliable sealing is given even under operating conditions with more stringent demands. If, however, these individual pores deviate from the specified mean pore diameter and porosity, then the sealing effect will be adversely affected.

If the individual pore diameter is too large, then the interpore material thickness is reduced with the result that refrigerant and lubricant will escape in larger quantities to the atmospheric side and that the sealing action will be adversely affected. With regard to this diameter of the individual pores should preferably not be larger than 60 μm. Porosity exceeding 15% will reduce the strength of the ring itself so that it is no longer capable of maintaining the strength of the rotating mechanical seal. On the other hand, porosity of 2% or less is not able to ensure the required amount of liquid lubrication, whereby lubrication of the sealing surfaces is reduced. These aspects thus mandate porosity of between 2% and 15%.

Figure 2:
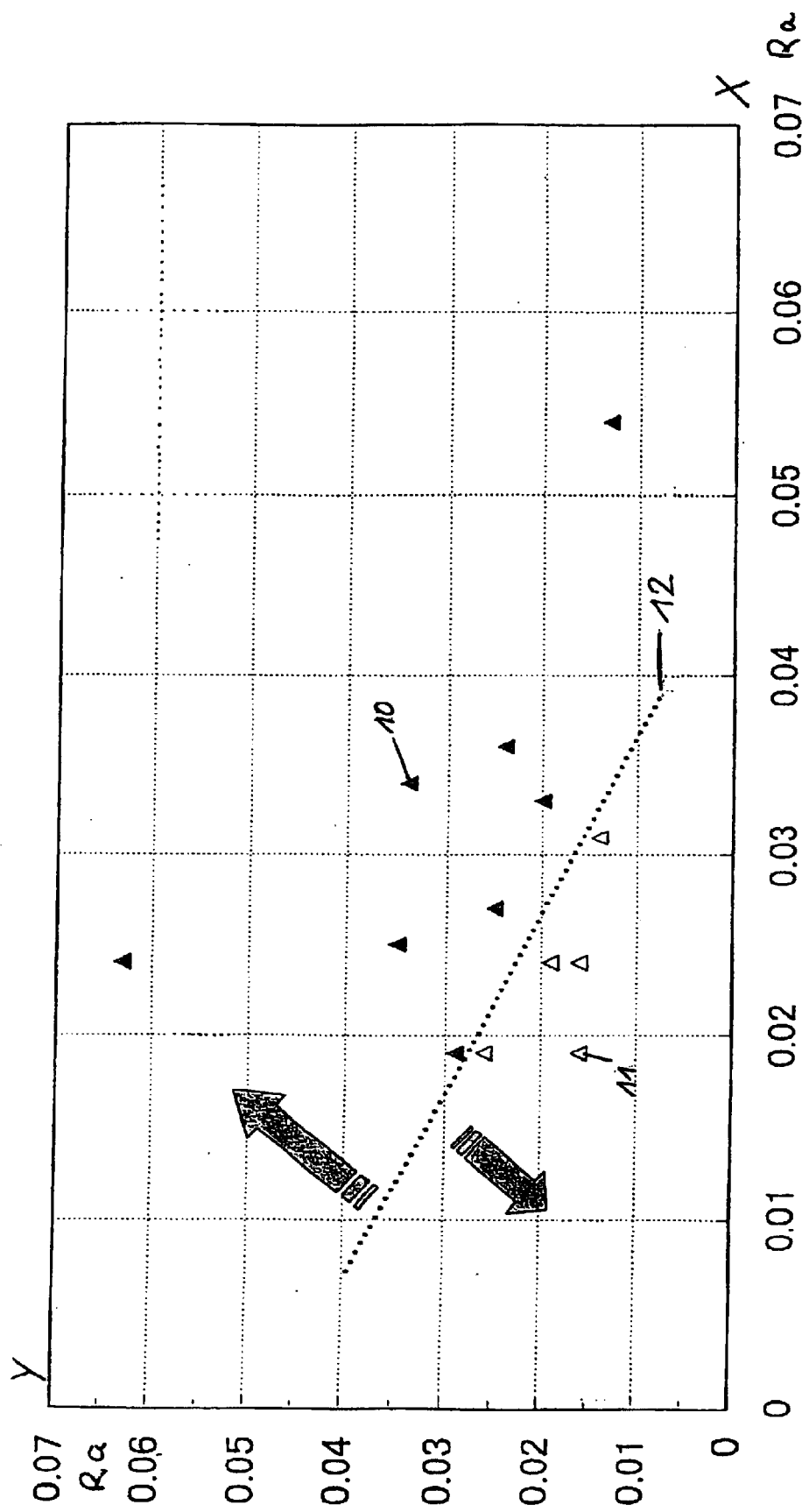
FIG. 2 shows a graphic depiction of the effect of sealing surface roughness on leakage in the rotating mechanical seal.

Compressors for automotive air conditioning systems are not in operation most of the time and are switched off. When the compressor is at a standstill, the refrigerant is saturated so that the pressure inside the compressor will change with the ambient temperature. In the case of carbon dioxide refrigerant, the pressure in the compressor is about 5 MPa at room temperature of 20° C. If under these conditions higher pressure is exerted on the sealing surface, the carbon dioxide refrigerant and the lubricating oil may escape to the atmospheric side A if the gap at the sealing surface is large, at greater surface roughness, for example. This prompted the conduct of a study to examine leakage resulting from roughness at the sealing surface. The results of this study are summarized in FIG. 2, which shows the dependency of leakage on the roughness of the sliding surfaces. FIG. 2 shows that leakage is minimal if the surface roughness at the carbon silicon carbide composite material is from 0.005 to 0.07 μm and that of the silicon carbide material is of 0.002 to 0.03 μm, measured as the mean arithmetic roughness ($R_a$). This value includes, however, the pores in the rings containing pores.

The roughness $R_a$(μm) at the sliding ring surface is shown along the X axis and the roughness $R_a$(μm) of the backing ring surface is shown along the Y axis. The triangles indicate the measurement points. Here the solid triangles 10 indicate the occurrence of leakage and the outlined triangles 11 indicate measurement points where no leakage was found. The dotted line 12 represents a border between those areas with and without leakage.

The mean arithmetic roughness ($R_a$) is obtained by taking a standard length from a roughness curve in the direction of a mean line and expresses the roughness curve along the X axis in the direction of the mean line of the selected section and along the Y axis in the direction of a longitudinal ratio:

$$Y=f(x)$$

wherein the value obtained is expressed in micrometers by way of the following equation:

$$R_a=f(x)dx$$

where L represents a standard length.

The present invention is a rotating mechanical seal in which one of the sealing surfaces is made up of a carbon and silicon carbide composite material and the other of a silicon carbide material. This combination of a carbon and silicon carbide composite material and a silicon carbide material at the sealing surface suppresses deformation of the sealing surface under pressure and thus prevents damage to the same and represents in particular a durable seal.

What is claimed is:

1. A rotating mechanical seal comprising: a sliding ring (5) being attached to a shaft (1) by an O-ring (6), the sliding ring rotating with the shaft (1); and a non-rotating backing ring (4) which is attached by way of an O-ring (3) to a housing (2) of a compressor so as to be gas-tight, wherein the sliding ring (5) and backing ring (4) are pressed one against the other by way of a spring (8) to form a seal and slide one upon the other, and wherein one of the rings (4, 5) is made of a carbon and silicon carbide composite material and the other of a silicon carbide material, wherein the carbon and silicon carbide composite material exhibits sealing surface properties with a roughness value of from 0.005 to 0.07 μm and the silicon carbide material exhibits sealing surface properties with a roughness value from 0.002 to 0.03 μm, expressed as mean arithmetic roughness ($R_a$), with the pores being excepted.

2. A rotating mechanical seal comprising: a sliding ring (5) being attached to a shaft (1) by an O-ring (6), the sliding ring rotating with the shaft (1); and a non-rotating backing ring (4) which is attached by way of an O-ring (3) to a housing (2) of a compressor so as to be gas-tight, wherein the sliding ring (5) and backing ring (4) are pressed one against the other by way of a spring (8) to form a seal and slide one upon the other, and wherein one of the rings (4, 5) is made of a carbon and silicon carbide composite material and the other of a silicon carbide material, wherein the carbon and silicon carbide composite material exhibits a structure which is obtained by partial conversion of the surface layer of the carbon substrate into a silicon carbide material, and wherein the carbon and silicon carbide composite material exhibits sealing surface properties with a roughness value of from 0.005 to 0.07 μm and the silicon carbide material exhibits sealing surface properties with a roughness value from 0.002 to 0.03 μm, expressed as mean arithmetic roughness ($R_a$), with the pores being excepted.

3. A rotating mechanical seal comprising: a sliding ring (5) being attached to a shaft (1) by an O-ring (6), the sliding ring rotating with the shaft (1); and a non-rotating backing ring (4) which is attached by way of an O-ring (3) to a housing (2) of a compressor so as to be gas-tight, wherein the sliding ring (5) and backing ring (4) are pressed one against the other by way of a spring (8) to form a seal and slide one upon the other, and wherein one of the rings (4, 5) is made of a carbon and silicon carbide composite material and the other of a silicon carbide material, wherein the surface of the carbon and silicon carbide composite material has a carbon content from 40% to 85% and a silicon conversion ratio of from 60% to 15%, and wherein the carbon and silicon carbide composite material exhibits sealing surface properties with a roughness value of from 0.005 to 0.07 μm and the silicon carbide material exhibits sealing surface properties with a roughness value from 0.002 to 0.03 μm, expressed as mean arithmetic roughness ($R_a$), with the pores being excepted.

4. A rotating mechanical seal comprising: a sliding ring (5) being attached to a shaft (1) by an O-ring (6), the sliding ring rotating with the shaft (1); and a non-rotating backing ring (4) which is attached by way of an O-ring (3) to a housing (2) of a compressor so as to be gas-tight, wherein the sliding ring (5) and backing ring (4) are pressed one against the other by way of a spring (8) to form a seal and slide one upon the other, and wherein one of the rings (4, 5) is made of a carbon and silicon carbide composite material and the other of a silicon carbide material, wherein the carbon and silicon carbide composite material exhibits a structure which is obtained by partial conversion of the surface layer of the carbon substrate into a silicon carbide material, wherein the surface of the carbon and silicon carbide composite material has a carbon content from 40% to 85% and a silicon conversion ratio of from 60% to 15%, and wherein the carbon and silicon carbide composite material exhibits sealing surface properties with a roughness value of from 0.005 to 0.07 μm and the silicon carbide material exhibits sealing surface properties with a roughness value from 0.002 to 0.03 μm, expressed as mean arithmetic roughness ($R_a$), with the pores being excepted.

5. A rotating mechanical seal comprising: a sliding ring (5) being attached to a shaft (1) by an O-ring (6), the sliding ring rotating with the shaft (1); and a non-rotating backing ring (4) which is attached by way of an O-ring (3) to a housing (2) of a compressor so as to be gas-tight, wherein the sliding ring (5) and backing ring (4) are pressed one against the other by way of a spring (8) to form a seal and slide one upon the other, and wherein one of the rings (4, 5) is made of a carbon and silicon carbide composite material and the other of a silicon carbide material, wherein the silicon carbide material exhibits individual, non-contiguous pores of a mean pore size of not greater than 60 μm at porosity of from 2% to 15%, and wherein the carbon and silicon carbide composite material exhibits sealing surface properties with a roughness value of from 0.005 to 0.07 μm and the silicon carbide material exhibits sealing surface properties with a roughness value from 0.002 to 0.03 μm, expressed as mean arithmetic roughness ($R_a$), with the pores being excepted.

6. A rotating mechanical seal comprising: a sliding ring (5) being attached to a shaft (1) by an O-ring (6), the sliding ring rotating with the shaft (1); and a non-rotating backing ring (4) which is attached by way of an O-ring (3) to a housing (2) of a compressor so as to be gas-tight, wherein the sliding ring (5) and backing ring (4) are pressed one against the other by way of a spring (8) to form a seal and slide one upon the other, and wherein one of the rings (4, 5) is made of a carbon and silicon carbide composite material and the other of a silicon carbide material, wherein the carbon and silicon carbide composite material exhibits a structure which is obtained by partial conversion of the surface layer of the carbon substrate into a silicon carbide material, wherein the silicon carbide material exhibits individual, non-contiguous pores of a mean pore size of not greater than 60 $\mu$m at porosity of from 2% to 15%, and wherein the carbon and silicon carbide composite material exhibits sealing surface properties with a roughness value of from 0.005 to 0.07 $\mu$m and the silicon carbide material exhibits sealing surface properties with a roughness value from 0.002 to 0.03 $\mu$m, expressed as mean arithmetic roughness ($R_a$), with the pores being excepted.

7. A rotating mechanical seal comprising: a sliding ring (5) being attached to a shaft (1) by an O-ring (6), the sliding ring rotating with the shaft (1); and a non-rotating backing ring (4) which is attached by way of an O-ring (3) to a housing (2) of a compressor so as to be gas-tight, wherein the sliding ring (5) and backing ring (4) are pressed one against the other by way of a spring (8) to form a seal and slide one upon the other, and wherein one of the rings (4, 5) is made of a carbon and silicon carbide composite material and the other of a silicon carbide material, wherein the surface of the carbon and silicon carbide composite material has a carbon content from 40% to 85% and a silicon conversion ratio of from 60% to 15%, wherein the silicon carbide material exhibits individual, non-contiguous pores of a mean pore size of not greater than 60 $\mu$m at porosity of from 2% to 15%, and wherein the carbon and silicon carbide composite material exhibits sealing surface properties with a roughness value of from 0.005 to 0.07 $\mu$m and the silicon carbide material exhibits sealing surface properties with a roughness value from 0.002 to 0.03 $\mu$m, expressed as mean arithmetic roughness ($R_a$), with the pores being excepted.

8. A rotating mechanical seal comprising: a sliding ring (5) being attached to a shaft (1) by an O-ring (6), the sliding ring rotating with the shaft (1); and a non-rotating backing ring (4) which is attached by way of an O-ring (3) to a housing (2) of a compressor so as to be gas-tight, wherein the sliding ring (5) and backing ring (4) are pressed one against the other by way of a spring (8) to form a seal and slide one upon the other, and wherein one of the rings (4, 5) is made of a carbon and silicon carbide composite material and the other of a silicon carbide material, wherein the carbon and silicon carbide composite material exhibits a structure which is obtained by partial conversion of the surface layer of the carbon substrate into a silicon carbide material, wherein the surface of the carbon and silicon carbide composite material has a carbon content from 40% to 85% and a silicon conversion ratio of from 60% to 15%, wherein the silicon carbide material exhibits individual, non-contiguous pores of a mean pore size of not greater than 60 $\mu$m at porosity of from 2% to 15%, and wherein the carbon and silicon carbide composite material exhibits sealing surface properties with a roughness value of from 0.005 to 0.07 $\mu$m and the silicon carbide material exhibits sealing surface properties with a roughness value from 0.002 to 0.03 $\mu$m, expressed as mean arithmetic roughness ($R_a$), with the pores being excepted.

* * * * *